Nov. 24, 1925.
W. C. STEVENS
CORE
Filed May 6, 1922
1,562,662
2 Sheets-Sheet 1
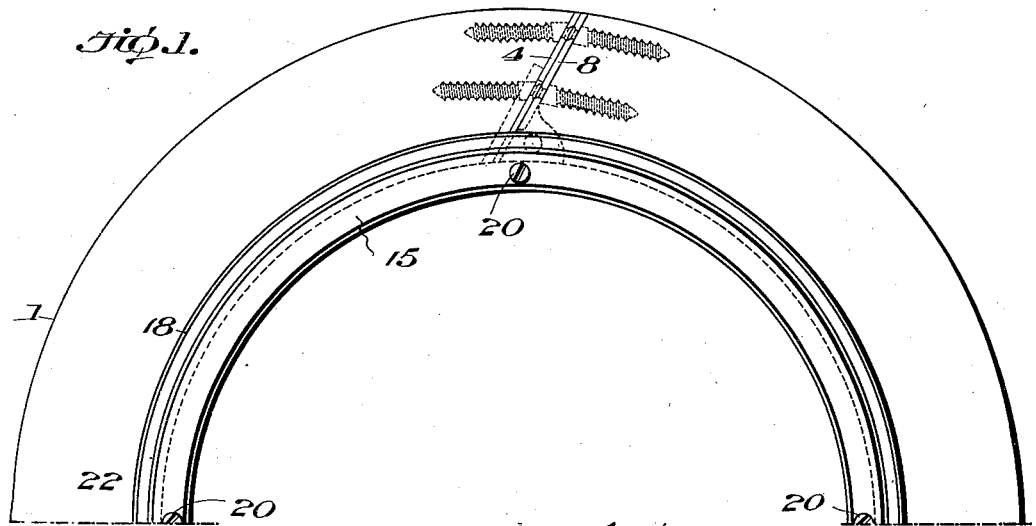
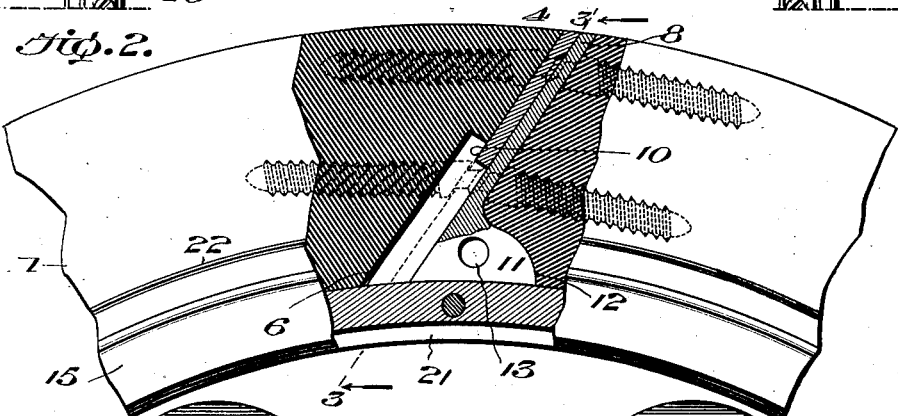
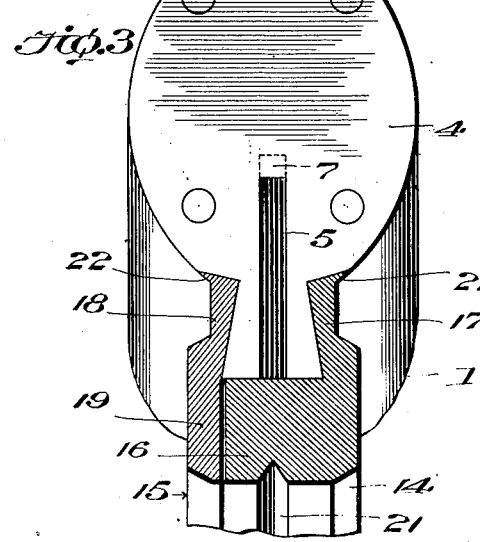
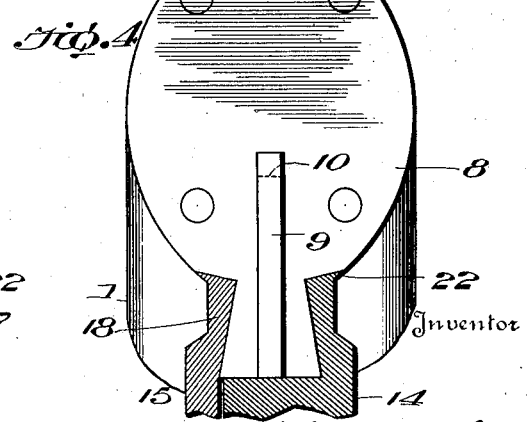
Inventor
William C. Stevens
By G. L. Ely
Attorney Nov. 24, 1925.                                                      1,562,662
W. C. STEVENS
CORE
Filed May 6, 1922                          2 Sheets-Sheet 2
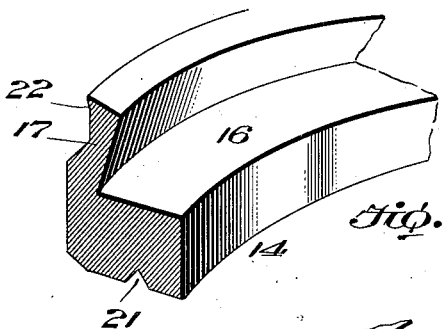
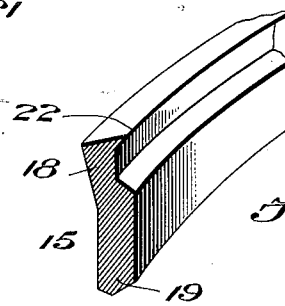
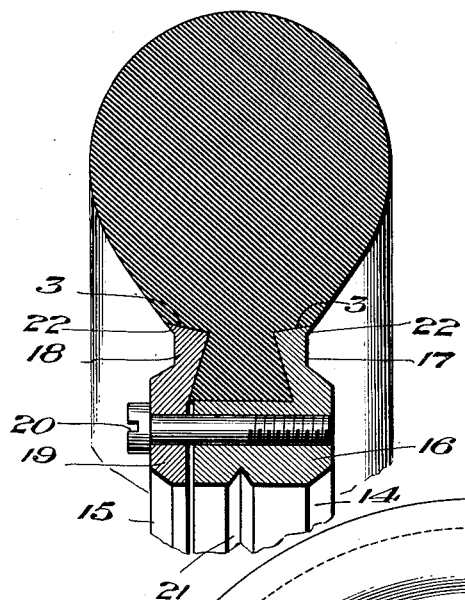
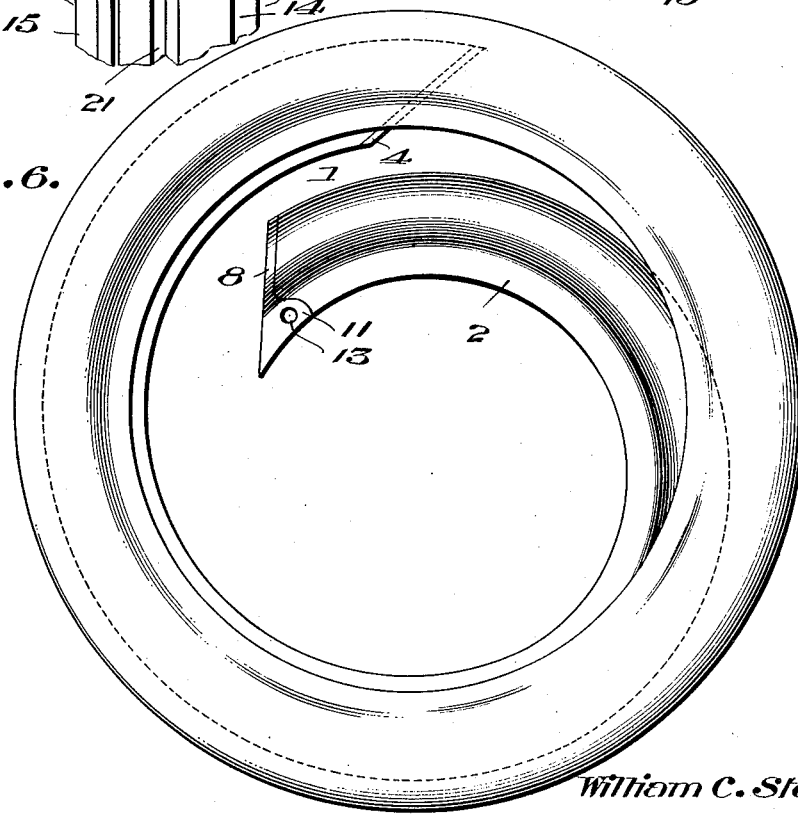
Inventor
William C. Stevens
By
Attorney Patented Nov. 24, 1925.

1,562,662

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

CORE.

Application filed May 6, 1922. Serial No. 558,943.

*To all whom it may concern:*

Be it known that I, WILLIAM C. STEVENS, a citizen of the United States, residing at Akron, in the county of Summit, State of Ohio, have invented certain new and useful Improvements in Cores, of which the following is a specification.

My invention relates, broadly, to cores and specifically to cores for use in building pneumatic tire casings, or other annular objects.

In the tire building industry pneumatic tires are built upon annular cores and vulcanized upon these cores, or the cores are removed and expansible "air bags" placed therein for vulcanization. Such cores are commonly constructed of iron and are therefore heavy, cumbersome in nature, and difficult to handle. Moreover, in order that the casings with inextensible beads may be removed from such cores, it is necessary to form the complete core of a plurality of sections, which become jammed together and frequently require, in the larger sizes, the use of special apparatus before they can be disassembled.

It is the broad purpose of the present invention to provide a core which is lighter in weight than existing structures and which may be readily and expeditiously removed from within a tire casing.

It is a further object of my invention to provide a core that comprises substantially a single unit that may be supported in annular form to sustain a tire casing, and collapsed or flexed from such form to withdraw it from the casing when desired, and which core can be readily and easily manufactured in large quantities by the tire manufacturer without the expensive machinery now required by the metal cores. To accomplish these objects I propose to substitute, for the metallic core of the prior art, a core of rubber or rubber composition.

Other objects and advantages such as simplicity of structure and relatively low cost of manufacture will appear and the nature of my invention will be more fully understood when the following description is read in conjunction with the drawings accompanying and forming a part of this specification.

In the drawings in which like numerals of reference designate corresponding parts throughout each of the several views:

Figure 1 is a side elevational view of one-half of a core constructed in accordance with my invention;

Figure 2 is a fragmentary view partly in section and partly in elevation further illustrating the invention, on an enlarged scale;

Figure 3 is a transverse sectional view taken on the line 3—3 of Figure 2 and looking in the direction indicated by the arrows;

Figure 4 is a view similar to Figure 3, taken substantially on the same line, but looking in the opposite direction to that indicated by the arrows;

Figure 5 is a transverse sectional view of Figure 1 drawn to a further enlarged scale, and taken substantially on the line 5—5 thereof;

Figure 6 is a side elevational view illustrating a feature of the operation of my invention;

Figure 7 is a fragmentary sectional view illustrating a detail of the invention; and Figure 8 is a view similar to Figure 7 illustrating another detail of the invention.

In the present practice of my invention, I provide a core proper that is of a semi-flexible character and comprises a single strip or unit that is preferably preformed to readily assume the contour of an annulus. Such a unit is illustrated as 1 in the drawings. I prefer to form the unit 1 of a strip of rubber or rubber composition that has been vulcanized to a degree of hardness which will afford substantially a rigid working surface upon the unit and still provide for a certain degree of flexibility in the unit whereby it may be distorted laterally and radially. The vulcanizing operation may be effected through the use of a mold if desired, whereby, at the same time, the unit may be shaped into the required cross-sectional contour and formed into a semi-permanent annular shape.

The ends of the unit are preferably formed in a plane at an angle to its radius whereby it may be flexed from annular form by moving its ends into overlapping relation and distorting it into the form of a coil, for instance as shown in Figure 3. The unit 1 upon its inner periphery is formed with a radial flange 2 that in cross-section is of dovetail shape. At the juncture of the flange 2 with the unit, an annular shoulder 3 is formed upon each side of the flange for a purpose presently apparent. Preferably the shoulders 3 are, in cross-section, inclined respectively from the sides of the unit toward the axis thereof.

One end of the unit 1 is provided with a cap plate 4, of the same cross-sectional contour as the unit, which is slotted in the plane of the unit to form a key-way 5. This end of the unit 1 is chambered, as shown at 6, in line with the key-way 5, the chamber being slightly longer than the key-way, whereby the plate 2 overhangs the outer end of the key-way to form a keeper lug 7 for a purpose presently explained. The other end of the unit 1 is provided with a similar plate 8 having a key member 9 therein also disposed in the plane of the unit and adapted to be received through the key-way 5 of plate 2 in the chamber 6. At its outer end the key member 9 is notched as at 10 to receive the keeper lug 7 of the plate 2 and thus lock the ends of the unit against circumferential movement. At its inner end the plate 8 is provided with a lug 11 that projects rearwardly therefrom and is received in a notch 12 in the unit. An aperture 13 is provided in the lug 11 to receive a suitable tool whereby the ends of the unit may be moved to disengage the key member 9 from the key-way 5 as will be obvious without further explanation.

The unit 1 is designed to be supported in annular form and to be retained in such form by means of a pair of cooperating clamping rings designated respectively 14 and 15. Ring 14 comprises a laterally extending annular portion 16 adapted to receive and seat the radial flange 2, and an upstanding flange 17 for preventing lateral displacement of the flange 2 in one direction. Ring 15 likewise comprises an upstanding flange 18 adapted to be secured in opposite relation to the flange 17 to clamp the flange 2 therebetween and a portion 19 which is bolted or otherwise secured to the laterally extending portion of ring 14 as shown at 20. Flanges 17 and 18 have their inner faces inclined to form in their opposed relation an annular channel corresponding in cross-sectional shape to the cross-sectional shape of the flange 2 of the unit. The outer peripheral face 21 of each ring 14 and 15 is also inclined transversely to correspond with the transverse inclination of the annular shoulders 3 of the unit 1. If desired a circumferential groove 21 may be formed in the inner periphery of ring 14 for centering it upon a chuck or other rotatable support. Preferably the outer sides of the flanges 17 and 18 of the rings 14 and 15 are vertical adjacent the unit 1 for the greater portion of their height being extended upwardly a short distance, as at 22, to form a trimming line, but this feature may be varied as desired.

It will now be seen that by virtue of my invention, I provide a light flexible core adapted to be supported in the form of an annulus by rigid clamping members, one of which may be permanently secured upon a rotatable supporting element and that upon detaching the other clamping element from the supported element, the unit 1 may be readily removed from the first clamping element and flexed in the manner previously set forth to remove it from a casing which has been built thereon. The manner in which the unit may be again formed into an annulus for use in conjunction with another casing will be apparent, it is believed, without further explanation.

A core of this character is not limited in use to the tire building operation, but may be successfully utilized in conjunction with the vulcanization of casings. This is a matter, obviously, of compounding the rubber and previously vulcanizing the unit to the proper degree to withstand the action of the degree of heat used in vulcanizing tire casings. After a single mold has been constructed, the tire manufacturer may duplicate the cores at little expense.

Although the invention has been described in detail, it is to be understood that the present disclosure is illustrative in character and is not to be construed as limiting the scope or spirit of the invention unless such limitations are expressly specified in the claims appended hereto.

What I claim is:

1. A core comprising a flexible transversely split solid annulus of rubber compound comprising end portions adapted for locking engagement.

2. A core comprising a flexible transversely split solid annulus of rubber compound having end portions adapted for locking engagement and arranged for disengagement by movement of one end portion in the plane of the core.

3. A core comprising a solid annulus of rubber composition transversely split to provide end portions said end portions being adapted for locking engagement and for disengagement by movement of one end portion in the plane of the core and toward the center thereof.

4. A core comprising a solid annulus of rubber composition transversely split in a plane oblique to the radius of the core to provide end portions said portions being adapted for locking engagement and for disengagement by movement of one portion in the plane of the annulus.

5. A core comprising a solid annulus of rubber composition transversely split in a plane oblique to the radius of the core to provide end portions said portions being adapted for locking engagement and for disengagement by movement of one portion in the plane of the core and toward the center thereof.

6. A core comprising a flexible transversely split annulus having end portions adapted for locking engagement, and removable rigid means adapted to support the inner peripheral portion of the annulus.

7. A core comprising a flexible transversely split annulus having end portions adapted for locking engagement, and removable supporting elements adapted to clamp the inner peripheral portion of the annulus.

8. A core comprising a flexible transversely split annulus having end portions adapted for locking engagement said annulus comprising a radial flange, and removable supporting means adapted to clamp the radial flange therebetween.

9. A core comprising a flexible transversely split annulus having end portions adapted for locking engagement said annulus comprising a radial flange of dovetail form in cross-section, and removable clamping rings adapted for relative arrangement to clamp said flange therebetween.

10. A core comprising a solid annulus of rubber composition having a radial flange of dovetail form in cross-section said core being transversely split in a plane oblique to the radius thereof to provide end portions, means upon each end portion adapted for relative locking engagement to secure said portions against individual circumferential movement, and removable clamping rings adapted for relative arrangement to clamp the radial flange of the annulus therebetween.

11. A core for use in tire building comprising a solid body portion of flexible material and a stiffening ring secured thereon.

12. A core for use in tire building comprising a solid body portion of flexible material divided transversely so that it may be bent into a spiral and a stiffening ring secured thereon.

WILLIAM C. STEVENS.